(12) United States Patent
Di Giovanni et al.

(10) Patent No.: US 11,326,524 B2
(45) Date of Patent: May 10, 2022

(54) RING GEAR FOR AN EPICYCLIC OR PLANETARY REDUCTION GEAR OF A TURBOMACHINE

(71) Applicant: SAFRAN TRANSMISSION SYSTEMS, Colombes (FR)

(72) Inventors: Jean-Charles Michel Pierre Di Giovanni, Moissy-Cramayel (FR); Alexis Claude Michel Dombek, Moissy-Cramayel (FR); Florian Rappaport, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 128 days.

(21) Appl. No.: 16/623,304

(22) PCT Filed: Jun. 25, 2018

(86) PCT No.: PCT/EP2018/066963
§ 371 (c)(1),
(2) Date: Dec. 16, 2019

(87) PCT Pub. No.: WO2019/007742
PCT Pub. Date: Jan. 10, 2019

(65) Prior Publication Data
US 2020/0208577 A1    Jul. 2, 2020

(30) Foreign Application Priority Data

Jul. 5, 2017   (FR) ...................................... 1756346

(51) Int. Cl.
*F16H 57/04*    (2010.01)
*F02C 7/36*     (2006.01)
*F16H 57/02*    (2012.01)

(52) U.S. Cl.
CPC ............ *F02C 7/36* (2013.01); *F16H 57/043* (2013.01); *F16H 57/0482* (2013.01);
(Continued)

(58) Field of Classification Search
CPC ........ F02C 7/36; F16H 57/043; F16H 57/0482
See application file for complete search history.

(56) References Cited

U.S. PATENT DOCUMENTS 8,777,792 B2 * 7/2014 Imai .................... F16H 57/0486
475/159
2011/0299974 A1 * 12/2011 Gauthier ................. F02C 3/107
415/122.1
(Continued)

FOREIGN PATENT DOCUMENTS

DE    4304657 A1   11/1993
EP    2559913 A1    2/2013
(Continued)

OTHER PUBLICATIONS

International Search Report received for PCT Patent Application No. PCT/EP2018/066963, dated Aug. 16, 2018, 5 pages (2 pages of English Translation and 3 pages of Original Document).
(Continued)

*Primary Examiner* — Derek D Knight
(74) *Attorney, Agent, or Firm* — Womble Bond Dickinson (US) LLP

(57) ABSTRACT

A ring gear (114) for an epicyclic or planetary reduction gear (110) of a turbomachine, in particular of an aircraft, said ring gear extending about an axis and comprising first and second coaxial annular elements (114a, 114b) and comprising, respectively, two inner annular toothing sets (150) of different orientation, said first and second annular elements further comprising, respectively, first and second radially outer annular flanges (114ab, 114bb) for attaching said first
(Continued)

and second elements to each other, characterised in that one of said first and second flanges comprises, at its outer periphery, a cylindrical centring rim (164) configured to cooperate with the outer periphery of the other of said first and second flanges.

17 Claims, 3 Drawing Sheets

(52) U.S. Cl.
CPC ............... *F05D 2260/40311* (2013.01); *F05D 2260/98* (2013.01); *F16H 2057/02043* (2013.01); *F16H 2057/02073* (2013.01)

(56) References Cited

U.S. PATENT DOCUMENTS

2012/0238401 A1    9/2012  McCune et al.
2013/0225353 A1    8/2013  Gallet et al.

FOREIGN PATENT DOCUMENTS

| | | |
|---|---|---|
| FR | 2987416 A1 | 8/2013 |
| FR | 3041054 A1 | 3/2017 |
| FR | 3041730 A1 | 3/2017 |
| WO | 2010/092263 A1 | 8/2010 |

OTHER PUBLICATIONS

"Written Opinion of the ISA," PCT Application No. PCT/EP2018/066963 (dated Aug. 16, 2018).

* cited by examiner

RING GEAR FOR AN EPICYCLIC OR PLANETARY REDUCTION GEAR OF A TURBOMACHINE

TECHNICAL FIELD

The field of the present invention is that of turbine engines and more particularly that of differential transmission systems in these turbine engines, in particular planetary or epicyclic reduction gears.

PRIOR ART

The prior art comprises in particular documents WO-A1-2010/092263, FR-A1-2 987 416, FR-A1-3 041 730 and FR-A1-3 041 054.

Current turbine engines, in particular turbine engines that comprise one or more fan propellers for a secondary flow, comprise a transmission system, called a reduction gear, to drive this or these propellers at the correct rotation speed using the power turbine shaft of the primary body of the engine.

The operation of reduction gears, in particular on turbine engines with a fan propeller with a high dilution rate, requires an oil flow rate that is particularly substantial, of about from 6000 to 7000 litres per hour at take-off, in order to ensure the lubrication and the cooling of their pinions and bearings.

Among the reduction gears used, there are planetary and epicyclical (with train) reduction gears which have the advantage of offering substantial reduction rates in the rotation speed in reduced spaces.

Such a reduction gear comprises a sun pinion or central pinion, an external ring gear and planet pinions which are engaged with the sun pinion and with the ring gear, with the support of one of these three components having to be locked with respect to rotation for the operation of the gear train.

When the planet carrier is fixed with respect to rotation, the central pinion and the ring gear are driving and driven, respectively, or vice versa. The reduction gear is then of the type "planetary" type.

In the opposite case, of an epicyclical reduction gear, the external ring gear is fixed with respect to rotation and the central pinion and the planet carrier are driving and driven.

The main problem with this type of reduction gear is ensuring optimum meshing of each planet gear on the one hand with the central pinion but also with the ring gear.

The ring gear extends around the axis of the reduction gear and comprises first and second coaxial annular elements and comprising respectively two inner annular teeth sets of different orientations and intended to cooperate with each planet gear. The teeth sets of the ring gear are of the chevron type, with the teeth sets of the elements having propeller angles that are substantially opposite.

The annular elements of the ring gear respectively comprise first and second radially outer annular flanges for fastening elements together as well as to an annular gear ring carrier intended to extend around at least one portion of the ring gear.

Document DE-A1-43 04 657 discloses fastening by welding annular elements of a reduction gear ring gear. The invention relates here to another technology consisting of bolting the flanges together, i.e. to fasten them together by fastening means of the screw-nut type.

In the prior art, either for an epicyclic or planetary architecture, it is difficult to ensure optimum centring of the elements, as well as of the ring gear carrier. This centring or axial alignment is important in order to minimise any misalignment of the teeth sets of the ring gear elements during operation. The geometry of the aforementioned flanges directly influences the misalignment of the teeth sets during operation. The elements tend to come closer or to separate according to the vibration modes and the shapes of the teeth sets, the forces which are transmitted to the ring gear carrier by the flanges of the ring gear. In addition, a precise angular adjustment is necessary between the two elements in order to angularly locate the teeth sets of the elements.

Centring solutions for a ring gear of this type have already been proposed. However, these solutions are not entirely satisfactory. The solution that consists for example of providing a peripheral rim at the inner periphery of the flange of one of the elements, which is intended to be engaged in an annular recess with a shape complementary to the inner periphery of the flange of the other of the elements, is not satisfactory. Indeed, the presence of the rim and of the centring recess in the vicinity of the teeth sets of the elements is liable to hinder the transmission of the forces in the elements and cause different mechanical and vibratory behaviours of the elements during operation, and to result in misalignments of their teeth sets. Secondly, the centring via the interior of the elements prevents bringing the axial position of the webs of these elements closer to the median plane passing between the teeth sets. Moreover, the oil used for the lubrication of the reduction gear during operation must be able to be discharged and, when radial oil passages are provided through the ring gear, they consist in general of radial notches in the centring rim, which are not necessarily regularly distributed around the axis and which can locally increase its flexibility to the detriment of its centring function.

The invention aims to overcome at least some of the problems and disadvantages mentioned hereinabove.

PRESENTATION OF THE INVENTION

The invention relates for this purpose to a ring gear for an epicyclic or planetary reduction gear for a turbine engine, in particular of an aircraft, said ring gear extending around an axis and comprising first and second coaxial annular elements and comprising respectively two inner annular teeth sets of different orientation, said first and second annular elements further comprising respectively first and second radially outer annular flanges for attaching said first and second elements to each other, as well as more preferably to an annular gear ring carrier intended to extend around at least a part of the ring gear via fastening means of the screw-nut type, characterised in that one of said first and second flanges comprises at its outer periphery a cylindrical centring rim configured to cooperate with the outer periphery of the other of said first and second flanges.

The invention thus proposes to provide the centring of the ring gear elements via the exterior of their flanges, and not via the inside as mentioned hereinabove. The cylindrical rim can further be configured to provide centring of the ring gear carrier, by cooperating for example with an outer periphery of an annular fastening flange of this ring gear carrier.

The ring gear according to the invention can comprise one or more of the following features, taken separately from each other or in combination with each other:

said cylindrical rim extends continuously over 360°; this allows for a better distribution of the stresses after a shrunk-on assembly for example, each of said first and second flanges comprises an outer peripheral portion extending in a plane that is substantially perpendicular to said axis, and an inner peripheral portion extending in a plane that is angled with respect to said axis; this allows for the centring of the annular elements and indirectly the out-of-roundness of the teeth sets of each element; the precision of this centring has a significant impact on misalignment;

said peripheral rim is located at the outer periphery of said outer peripheral portion of one of said first and second flanges; this makes it possible to release space on the inner periphery in order to create symmetrical flanges, and to bring them axially closer to each other;

said rim allows for the assembly of the annular elements together and the assembly of the ring gear with the ring gear carrier;

said outer peripheral portions of said first and second flanges are axially bearing against one another and comprise axial through-orifices for the passage of said fastening means; this makes it possible to transmit the torque between each annular element and the ring gear carrier;

comprise radial bearing surfaces in which are formed radial notches (or slots) for the passage of oil; this makes it possible to create an oil passage and to lighten the parts;

said radial notches (or slots) communicate at their radially external ends with radial through-orifices formed in said cylindrical rim; this allows the oil to escape via the outside of the centring of the annular elements;

said radial notches (or slots) communicate at their radially internal ends with an internal annular cavity with a substantially triangular section and formed by said inner peripheral portions of said first and second flanges; machining tapping can be used in the present case in order to have a larger radius, which has the effect of reducing the stresses in this zone, which is relatively loaded; it also makes it possible to achieve the centring and the axial bearing face in a different operation with different parameters;

said outer peripheral portions of said first and second flanges comprise axial through-holes for mounting at least one pin for the angular adjustment of said first and second elements; this allows the orientation of the two annular elements in order to create a correct orientation of the teeth sets. The orientation has a direct influence on the position of the APEX of the teeth sets.

The present invention also relates to an epicyclic or planetary reduction gear for a turbine engine, in particular of an aircraft, characterised in that it comprises a ring gear such as described hereinabove.

BRIEF DESCRIPTION OF THE DRAWINGS

The present invention will be better understood and other details, features and advantages of the present invention will appear more clearly when reading the following description, in reference to the accompanying drawings in which.

DESCRIPTION OF AN EMBODIMENT OF THE INVENTION

Figure 1:
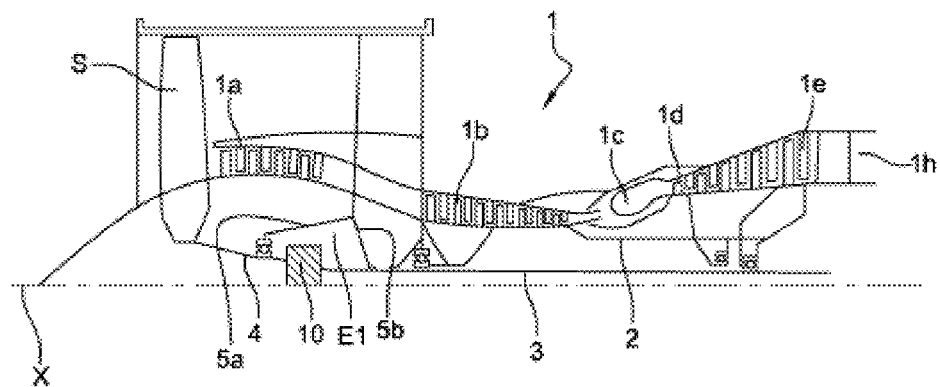
FIG. 1 schematically shows an axial cross-section of a turbine engine using the invention.

FIG. 1 shows a turbine engine 1 that comprises, conventionally, a fan propeller S, a low-pressure compressor 1a, a high-pressure compressor 1b, an annular combustion chamber 1c, a high-pressure turbine 1d, a low-pressure turbine 1e and an exhaust pipe 1h. The high-pressure compressor 1b and the high-pressure turbine 1d are connected by a high-pressure shaft 2 and form with it a high-pressure body (HP). The low-pressure compressor 1a and the low-pressure turbine 1e are connected by a low-pressure shaft 3 and form with it a low-pressure body (LP).

The fan propeller S is driven by a fan shaft 4 which is coupled to the LP shaft 3 by means of an epicyclic reduction gear 10 shown here schematically.

The reduction gear 10 is positioned in the front portion of the turbine engine. A fixed structure schematically comprising, here, an upstream portion 5a and a downstream portion 5b is arranged in such a way as to form an enclosure E1 that surrounds the reduction gear 10. This enclosure E1 is here closed upstream by seals on a bearing allowing the fan shaft 4 to pass through, and downstream by seals at the bushing of the LP shaft 3.

Figure 2:
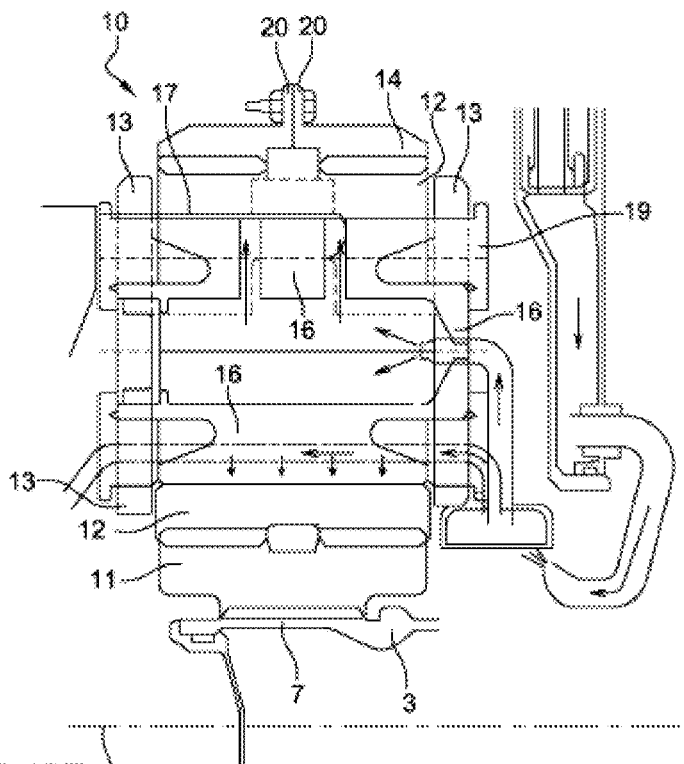
FIG. 2 shows a detailed cross-section view of an epicyclic reduction gear.
Figure 3:
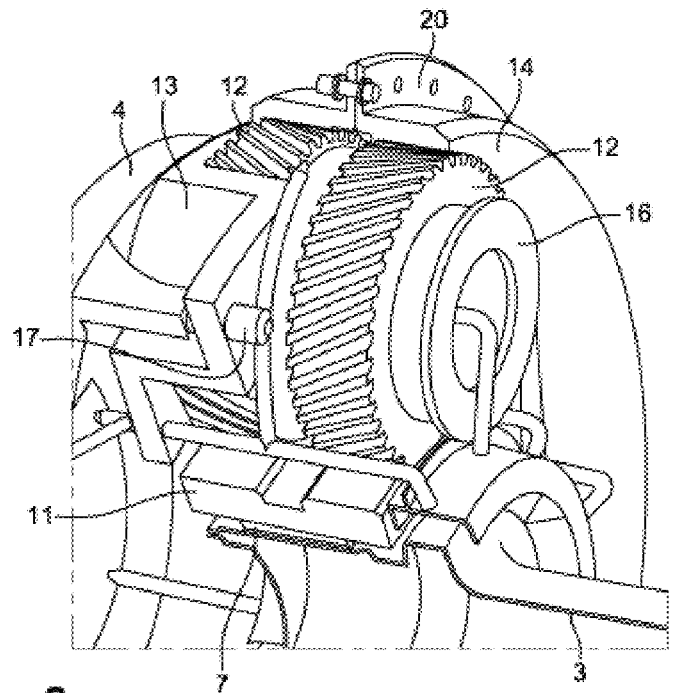
FIG. 3 is a cutaway perspective view of the reduction gear of FIG. 2.

In reference to FIGS. 2 and 3, the reduction gear 10 comprises a ring gear 14 that is fixed via a ring gear carrier (not shown) to the fixed structure 5a, 5b with flexible means arranged in order to allow it to follow any movements of the fan shaft 4, in certain cases with degraded operation for example. In a planetary architecture, the ring gear carrier comprises a more or less flexible portion that drives the ring gear and a shafted portion held by roller bearings or bearings and on which the fan is mounted. These fastening means are known to those skilled in the art and are not discussed in detail here. A brief description can be found for example in FR-A1-2987416.

The reduction gear 10 meshes on the one hand on the LP shaft 3 by means of splines 7 which drive a sun gear pinion 11, and on the other hand on the fan shaft 4 which is attached to a planet carrier 13. Conventionally, the sun pinion 11, the axis of rotation X of which is coincident with that of the turbine engine, drives a series of planet pinions or planet gears 12, which are regularly distributed over the circumference of the reduction gear 10. The number of planet gears 12 is generally defined between three and six. The planet gears 12 also rotate about the axis X of the turbine engine except in the case of a sun gear, where they rotate solely about their axes of revolution, meshing on inner teeth sets of the ring gear 14, which is fixed to a stator of the turbine engine by means of flanges 20 in the case of an epicyclic gear or fixed to a rotor of the turbine engine in the case of a sun gear. Each of the planet gears 12 freely rotates about a planetary shaft 16 connected to the planet carrier 13, by means of a bearing that can be plain, as shown in FIG. 2, or a bearing with rolling elements (ball or roller bearings).

The rotation of the planet gears 12 about their planetary axis 16, due to the cooperation of their pinions with the teeth sets of the ring gear 14, causes the rotation of the planet carrier 13 about the axis X, and consequently that of the fan shaft 4 that is connected to it, at a rotation speed that is less than that of the LP shaft 3.

FIG. 2 shows, with FIG. 3, the movement of the oil to the reduction gear 10 and its movement inside the latter. Arrows show in FIG. 2 the path followed by the oil from, in this example, a buffer tank connected to the fixed structure of the turbine engine, to the pinions and to the bearings to be lubricated. The lubrication device conventionally comprises three portions: a first portion connected to the fixed structure and delivering the oil to the rotating portions of the reduction gear 10, an impeller rotating with the planet carrier 13 that receives this oil in the case of an epicyclic gear and of a distributor assembled on the planet carrier, which are fixed on a planetary architecture, and oil distribution circuits supplied with oil by the impeller in order to convey it to the locations to be lubricated.

Figure 4:
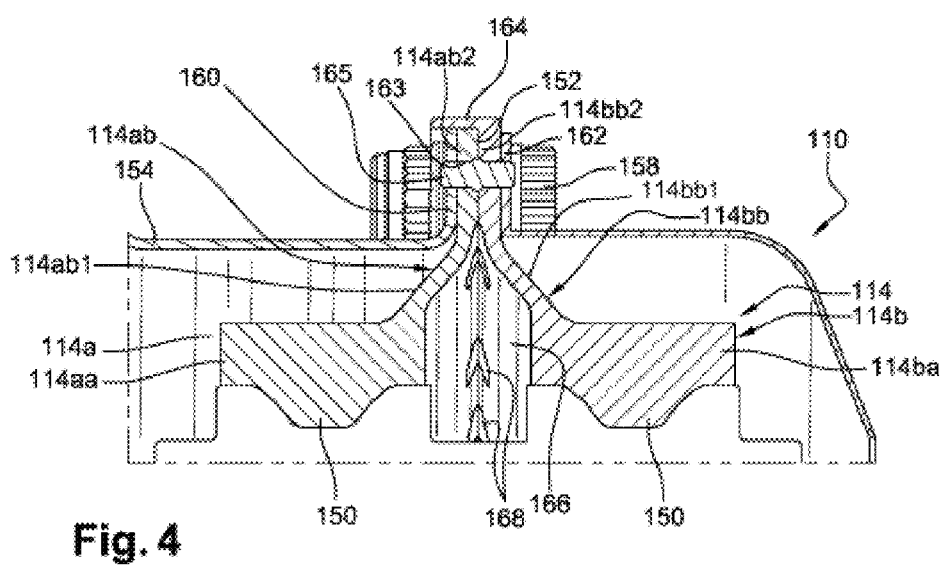
FIG. 4 is a partial axial-section view of a reduction gear provided with a ring gear according to the invention.
Figure 5:
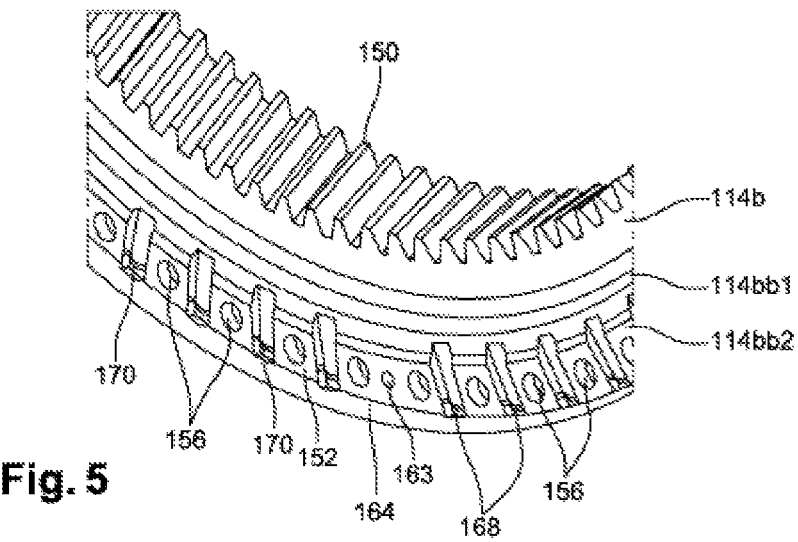
FIG. 5 is a partial perspective view of the ring gear of FIG. 4.
Figure 6:
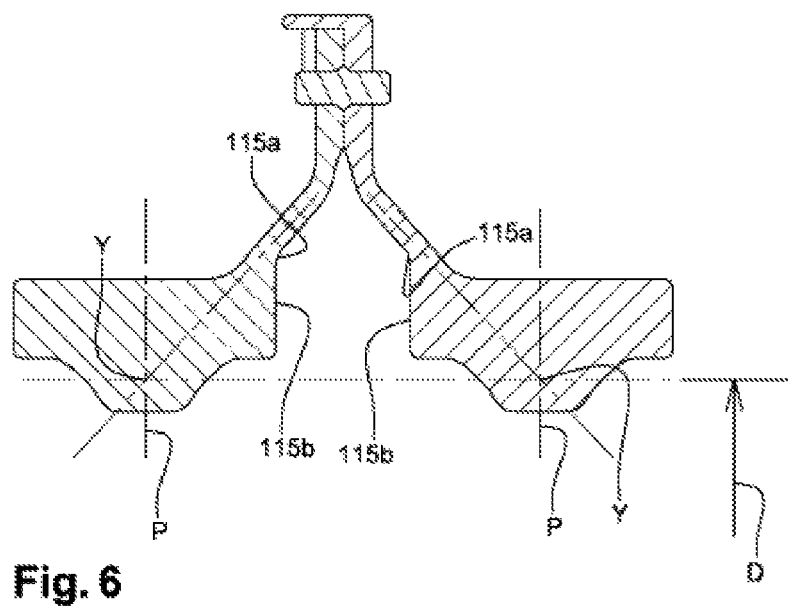
FIG. 6 is a partial axial cross-section of the ring gear of FIG. 4.

FIGS. 4 to 6 show an embodiment of a ring gear 114 according to the invention.

The ring gear 114 extends around an axis that is the axis X of the reduction gear 110 and of the turbine engine, and comprises two coaxial annular elements, termed first annular element 114a or upstream element and second annular element 114b or downstream element.

Each element 114a, 114b comprises an annular body 114aa, 114ba of general cylindrical shape and connected to an annular flange 114ab, 114bb extending radially outwards.

Each body 114aa, 114ba comprises an inner annular teeth set 150 at its inner periphery. Although not visible in the drawings, the teeth sets 150 of the two bodies or elements are complementary to teeth sets of the planet gears, which are of the type shown in FIG. 3. The teeth sets 150 of the elements 114a, 114b are in a chevron.

Each teeth set 150 comprises an outside diameter that passes through its outer periphery, an inside diameter that passes through its inner periphery, and a pitch diameter D that is measured substantially at mid-height or radial mid-dimension of the teeth set. Moreover, P denotes a median plane of each teeth set, with this plane being substantially perpendicular to the aforementioned axis and passing substantially in the middle of the teeth set in the axial direction.

The body 114aa, 114ba of each element is connected by a longitudinal end to the corresponding flange 114ab, 114bb. The body 114aa is connected at its downstream end, located on the side of the other body 114ba, to the flange 114ab, and the body 114ba is connected at its upstream end, located on the side of the other body 114aa, to the flange 114bb.

Each flange 114ab, 114bb has the general shape of a dihedron and comprises two peripheral portions, respectively inner 114ab1, 114bb1 and outer 114ab2, 114bb2.

The outer peripheral portions 114ab2, 114bb2 extend substantially perpendicularly to the axis and therefore have an orientation that is substantially radial. They are intended to be axially bearing against one another and thus each comprise an annular radial support surface 152.

The portions 114ab2, 114bb2 are used to fasten the elements 114a, 114b together, as well as to a ring gear carrier 154 in the example shown.

For this, the portions 114ab2, 114bb2 each comprise an annular row of axial through-orifices 156 for the passage of the fastening means 158 of the screw-nut or similar type. The orifices 156 of the portions 114ab2, 114bb2 are aligned and receive the fastening means 158.

The ring gear carrier 154 also comprises an annular flange 160 for fastening to the flanges 114ab, 114bb and in particular to the portions 114ab2, 114bb2. The flange 160 is applied axially to one of the portions 114ab2, 114bb2, namely here the portion 114ab2 of the upstream element 114a. The portion 114ab2 is thus inserted axially between the flange 160 and the portion 114bb2. The converse is also possible. By converse is meant that the ring gear carrier is on the right side of the ring gear, which represents the rear of the engine.

The flange 160 comprises orifices aligned with the orifices 156 and which also receive the fastening means 158, heads of which can be axially applied to the downstream face of the portion 114bb2 and nuts of which can be axially applied on the upstream face of the flange 160 or vice versa. In the example shown, a flange 162 of an annular oil collector is bearing axially on the portion 114bb2 and receives on its downstream face the heads of the nuts.

The portions 114ab2, 114bb2 further comprise a first set of axial threaded through-holes 163 that allow for dismantling of the ring gear carrier 154 with the ring gear 114. A second set of axial and tapped through-holes 163 makes it possible to dismantle the element 114a from the element 114b. The portions 114ab2, 114bb2 also comprise at least one pin 165 for the angular fixing of the elements 114a, 114b. Each portion 114ab2, 114bb2 can comprise one or more of these holes 163, intended to be aligned with one or more similar holes 163 of the other portion, and to receive a fixing pin 165. The pin 165 here has a general cylindrical shape and is oriented axially. It comprises an outer annular bead, substantially at its middle in the axial direction, and intended to be located substantially on surfaces 152 of the flanges.

The portion 114bb2 comprises at its outer periphery a cylindrical centring rim 164. This rim 164, which is carried by the element 114b, is configured to cooperate by axial sliding and radial support with the outer periphery of the other element 114a in order to ensure the centring, during mounting and operation, of this other element 114a. Alternatively, the element 114a could comprise such a rim intended to cooperate with the element 114b with a view to its centring.

The rim 164 is intended to cooperate with the outer periphery of the flange 114ab of the element 114a, and in particular with the radially external free annular edge of its portion 114ab2. During mounting, the rim 164 thus extends around the portion 114ab2.

In the example shown, the rim 164 also ensures the centring of the ring gear carrier 154. The rim 164 can cooperate as indicated hereinabove with the outer periphery of the flange 160.

The rim 164 extends here continuously over 360°. It is thus neither split nor sectorised. The reference surface for the centring is thus uninterrupted.

The inner peripheral portions 114ab1, 114bb1 are angled with respect to the axis X of the ring gear 114. The portion 114ab1 extends radially from upstream to downstream in the direction outwards, and the portion 114bb1 extends from upstream to downstream in the direction inwards. In the example shown, the portions 114ab1, 114bb1 are angled from 0° to 90° with respect to the axis of rotation of the ring gear X and more preferably between 30 and 60° and delimit an annular cavity 166 with a cross-section of generally triangular shape, the tip of which is oriented radially outwards. Their axial positions are such that the neutral fibre passes through the intersection of the median plane of the teeth set as well as its pitch diameter.

The portions 114ab1, 114bb1 make it possible to connect the portions 114ab2, 114bb2 to the bodies of the elements 114aa, 114bb. Due to the orientation of the portions 114ab1, 114bb1 and their connection to the longitudinal ends, respectively downstream and upstream, of the bodies 114a, 114b these bodies are axially separated from each other by a predetermined distance.

Lubrication oil is intended to flow during operation through this inter-body space and penetrate into the cavity 166. Substantially radial passages are provided between the flanges 114*ab*, 114*bb* in order to allow for the removal of the oil radially towards the exterior of the ring gear.

The oil passages are here formed on the one hand by substantially radial notches 168 or slots formed in the surfaces 152 of the flanges. Each flange comprises an annular row of notches 168 that are axially aligned with notches 168 on the other of the flanges. The notches are produced at a distance from the orifices 156 for passage of the fastening means 158, from the hole of the pin 165 and from the holes 163. Each notch has for example a cross-section of semicircular (half-oblong) or rectangular shape as in the example shown (FIG. 5).

The notches are in fluidic communication, at their radially internal ends, with the cavity 166, and at their axially external ends with oblong-shaped oil outlet through-orifices 170 formed in the centring rim 164. In other words, the oil passages open at their radially external ends onto the outer cylindrical surface of the rim 164, to form there oil outlet orifices 170.

FIG. 6 shows a partial axial cross-section of the reduction gear 110 in which Y designates the intersection between the plane P and the pitch diameter D for each teeth set 150. As can be seen in the drawing, the inner peripheral portion 114*ab*1, 114*bb*1 of each flange extends in a plane that passes substantially through the intersection point Y. This position as well as the aforementioned inclination are two important parameters in this embodiment.

Each inner peripheral portion 114*ab*1, 114*bb*1 has an inner peripheral surface 115*a* that extends radially outwards in the extension of an end radial surface 115*b* of the corresponding body. The axial distance between the surfaces 115*b* corresponds to the inter-element distance and to the maximum axial dimension of the cavity 166.

The inner peripheral portions 114*ab*1, 114*bb*1 have a substantially constant thickness.

Except for the rim 164, the ring gear elements 114*a*, 114*b* are symmetrical with respect to a median plane, perpendicular to the axis and passing substantially between the elements.

The ring gear 114 according to the invention is easier to produce, mount and control than those of prior technologies.

The invention can be applied to an epicyclic or planetary architecture. In the first, the ring gear is fixed and in the second the ring gear rotates around the engine shaft. The epicyclic or planetary ring gear are held by the ring gear carrier. However, the ring gear carrier can have a shape, a movement and a function that is different according to the type of architecture. In the case of an epicyclic architecture, the fan shaft portion is on the planet carrier and in the case of a planetary architecture it is located on the ring gear carrier.

The invention claimed is:

1. A ring gear for an epicyclic or planetary reduction gear for a turbine engine, in particular of an aircraft, said ring gear extending around an axis and comprising first and second coaxial annular elements and comprising respectively two inner annular teeth sets of different orientations, said first and second annular elements further comprising respectively first and second radially outer annular flanges for attaching said first and second elements to one another by a fastening means of the screw-nut type, wherein one of said first and second flanges comprises at its outer periphery a cylindrical centering rim configured to cooperate with the outer periphery of the other of said first and second flanges, wherein said first and second coaxial annular elements comprise respectively first and second annular bodies, wherein the first annular element is connected to the first radially outer annular flange and the second annular element is connected to the second radially outer annular flange.

2. The ring gear according to claim 1, wherein said cylindrical rim extends continuously over 360°.

3. The ring gear according to claim 1, wherein each one of said first and second flanges comprises an outer peripheral portion extending in a plane that is substantially perpendicular to said axis, and an inner peripheral portion extending in a plane angled with respect to said axis.

4. The ring gear according to claim 3, wherein said cylindrical rim is located at the outer periphery of said outer peripheral portion of one of said first and second flanges.

5. The ring gear according to claim 4, wherein said outer peripheral portions of said first and second flanges are axially bearing against one another and comprise axial through-orifices for passage of said fastening means.

6. The ring gear according to claim 5, wherein said outer peripheral portions of said first and second flanges comprise radial bearing surfaces in which are formed radial notches for the passage of oil.

7. The ring gear according to claim 6, wherein said radial notches communicate at their radially external ends with radial through-orifices formed in said cylindrical rim.

8. The ring gear according to claim 6, wherein said radial notches or slots communicate at their radially internal ends with an inner annular cavity with a substantially triangular section and formed by said inner peripheral portions of said first and second flanges.

9. The ring gear according to claim 5, wherein said outer peripheral portions of said first and second flanges comprise axial through-holes for mounting of at least one pin for the angular fixing of said first and second elements.

10. An epicyclic or a planetary reduction gear for a turbine engine, which comprises the ring gear according to claim 1.

11. The ring gear according to claim 1, wherein a downstream end of the first annular body is connected to a first longitudinal end of the first annular flange, wherein said downstream end is located on a side of the second annular body, and an upstream end of the second annular body is connected to a second longitudinal end of the second annular flange, wherein said upstream end is located on a side of the first annular body.

12. The ring gear according to claim 1, wherein each of the first and second annular flanges has a general shape of a dihedron and comprises two peripheral portions respectively, first and second inner peripheral portions and first and second outer peripheral portions.

13. The ring gear according to claim 1, wherein the first and second coaxial annular elements are symmetrical with respect to a median plane which is perpendicular to the axis and passing between said first and second coaxial annular flanges.

14. The ring gear according to claim 1, wherein the cylindrical centering rim extends directly from a radially outer peripheral portion of one of the first and second radially outer flanges, wherein the radially outer peripheral portion is perpendicular to the axis of the ring gear.

15. The ring gear according to claim 1, wherein the cylindrical centering rim covers the outer periphery of the other of said first and second coaxial annular elements, and the cylindrical centering rim comprises a longitudinal free end not in contact with said outer periphery of the other of said first and second coaxial annular elements.

16. A ring gear for an epicyclic or planetary reduction gear for a turbine engine, said ring gear extending around an axis and comprising first and second coaxial annular elements and comprising respectively two inner annular teeth sets of different orientations, said first and second annular elements further comprising respectively first and second radially outer annular flanges for attaching said first and second elements to one another by a fastening means of the screw-nut type, wherein one of said first and second flanges comprises at its outer periphery a cylindrical centering rim configured to cooperate with the outer periphery of the other of said first and second flanges, wherein said outer peripheral portions of said first and second flanges comprise radial bearing surfaces in which are formed radial notches for the passage of oil, and wherein said radial notches communicate at their radially external ends with radial through-orifices formed in said cylindrical centering rim.

17. An epicyclic or a planetary reduction gear for a turbine engine, which comprises the ring gear according to claim 16.

\* \* \* \* \*